Oct. 8, 1929.　　　H. E. WARREN　　　1,731,117
MANUFACTURE OF GEARS AND THE LIKE
Filed Dec. 27, 1926　　2 Sheets-Sheet 1

Inventor:
Henry E. Warren,
by His Attorney.

Patented Oct. 8, 1929

1,731,117

UNITED STATES PATENT OFFICE

HENRY E. WARREN, OF ASHLAND, MASSACHUSETTS

MANUFACTURE OF GEARS AND THE LIKE

Application filed December 27, 1926. Serial No. 157,220.

The present invention relates to the manufacture of gears and similar articles having definitely shaped or toothed surfaces. More particularly, it relates to the manufacture of very small articles of the above character, such as clock pinions, for example.

The manufacture of small clock pinions and the like involve difficulties which are not encountered in connection with the manufacture of larger gears and similar toothed articles. Such small articles cannot be held and cut by ordinary means, and are too small to be handled easily. In addition, great care and attention through a series of operations has heretofore been necessary to insure accuracy of outline or tooth form, and uniformity throughout large quantity production, all of which has contributed to relatively high manufacturing costs.

The present invention has for its object the eliminations of difficulties heretofore experienced in the manufacture of small pinions and the like and the provision of an improved machine for more rapidly and accurately producing articles of that character than has heretofore been possible.

In carrying out my invention, a machine is provided which operates to form pinions or other definitely shaped bodies from a thin ribbon of any suitable material, such as steel for example. The ribbon is provided with spaced perforations which are of a diameter to form a drive fit with the pivot or spindle for the finished pinion or body, and is successively stamped by a punch and die means in the machine, with the perforations as centers to form toothed laminations or thin bodies of the same definite shape as that of the body desired. The laminations are automatically stacked by the punch which forces them one by one down into a holder located below the die wherein they are held in accurate alignment with one another.

A pivotal shaft or spindle is pressed into the stack while in the holder when a certain number of laminations are in place to provide the desired thickness of the finished pinion or body, with the result that a finished article is produced by the one continuous cycle of operations, which comprises alternate cutting and stacking of the individual laminations and mounting the completed stack on the spindle which serves to unite the laminations and hold them permanently in alignment. In the case of pinion gears, the spindles form the pivot shafts or axes therefor.

The teeth are so accurately formed that no further finishing is required. The arrangement is such that a reel of ribbon supplies the material at one end of the machine and completely finished pinions are ejected at the other without handling or removal from the machine during the process of manufacture.

The advantages which this arrangement gives over those heretofore known will be more readily appreciated when the very small size of the articles which may be produced thereby is considered. By way of example, the machine of the present invention is adapted to produce articles such as small clock pinions less than one-eighth of an inch in diameter, having twelve teeth and a face width of less than one-eighth inch mounted on a pivot which is less than five-sixteenths of an inch in length.

Articles of such small size are very difficult to handle and the laminations are so small and of such wafer-like thinness that they cannot readily be picked up with the fingers. Hence the laminations could not be cut and later aligned on a shaft or other means. In the machine of the present invention, handling of the individual parts which make up the pinion or other article is entirely eliminated.

For a further consideration of what is believed to be novel and the invention, attention is now directed to the accompanying drawings, the description thereof, and the appended claims.

Referring to the drawing, particularly to Figs. 1 to 4 inclusive, 12 is a suitable base for the machine. This may be of any suitable construction.

Integral with the base is an L-shaped bracket or arm 13 which rigidly supports an elongated vertically extending bearing 14 in which is arranged to reciprocate a punch holder or plunger 15. The plunger makes a smooth and accurate sliding fit in the bearing.

The lower end of the plunger carries a removable punch 16 which is seated in an axial recess 17 and is retained by a removable pin 18. In the present example, the punch is provided with pinion teeth 19 for cutting pinion laminations of the desired shape and size and operates in conjunction with a corresponding fixed die 20 located in the base. The die is formed in a block 21, in which is provided a cavity or holder 22 below the die for receiving and holding the laminations in stacked accurately aligned relation to each other as stamped by the punch. The material from which the pinion laminations are stamped passes in the form of a thin ribbon 23 between the punch and the die in a guide way 24 secured to the base.

The die and the holder 22 below it are together longer than the total height of the laminations indicated at 25 to be received at one time and the laminations are retained in the holder 22 by friction, the points of the teeth being held in shallow grooves 26 in the holder. Each lamination, as punched, is forced down upon the stack, which is thereby moved downwardly in the holder.

The die block 21 is located in a removable mounting ring or holder 27, which is seated in a bossed opening 28 in the machine base, which opening is provided in carefully located axial alignment with the bearing 14. The rigid arm 13 and bearing 14 being integral with the base, serves to maintain the alignment between the die, which is thus located by the bossed opening 28, and the punch which is directed by the bearing 14.

To further insure the proper entry of the punch into the die, the die block holder is provided with a shouldered head 29 in which is located a guide bearing opening 30 for the cutting end of the punch. This guide bearing opening conforms in shape to the outline of the punch and is accurately aligned with the die.

Figures 2, 3, 5, 6:
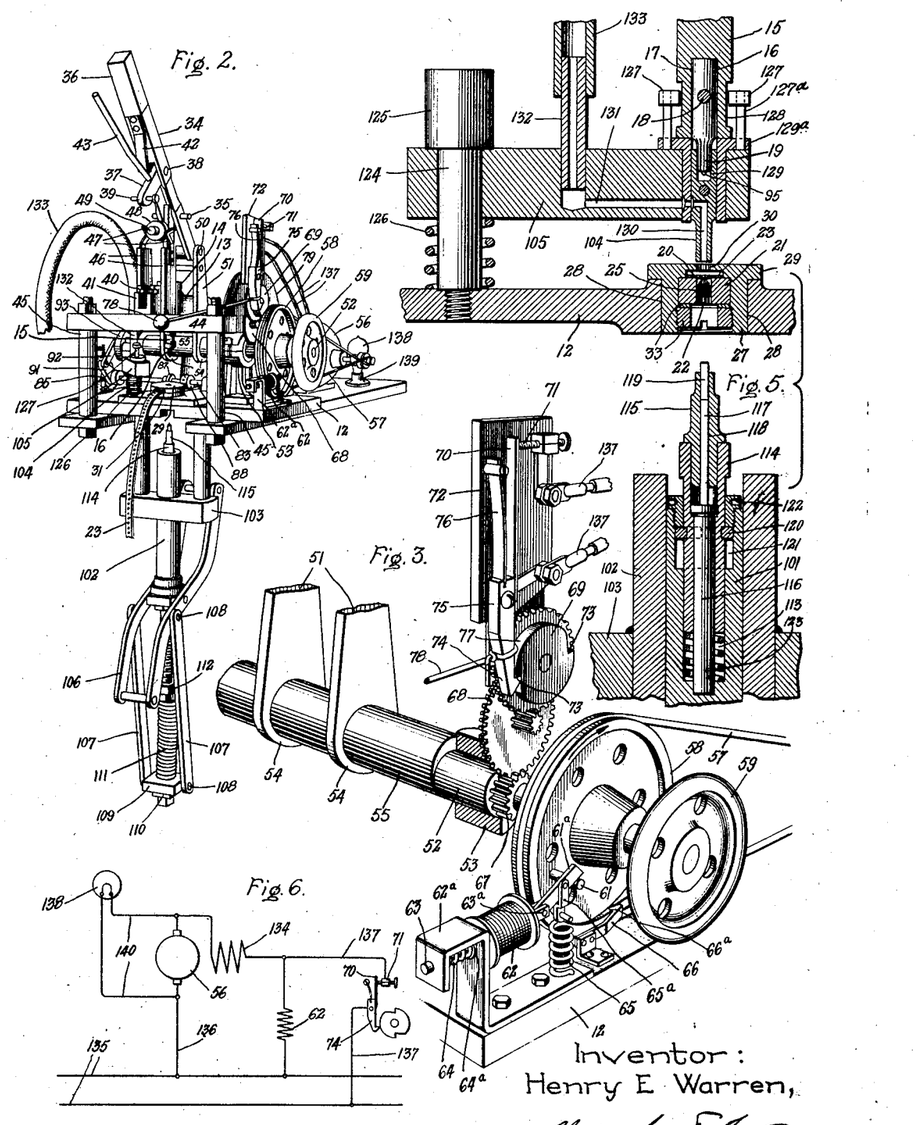
Fig. 2 is a similar right front view of the same machine on a smaller scale showing a lower plunger arrangement.
Figs. 3 and 4 are detail views in perspective, on an enlarged scale, of the main drive shaft with timing mechanism, and ribbon feed shaft and indexing mechanism, respectively.
Fig. 5 is a detail side view, partly in section, of the knockout and lower plunger arrangement of the machine in position to remove a finished pinion.
Fig. 6 is a wiring diagram of the control means for the machine.
Figure 4:
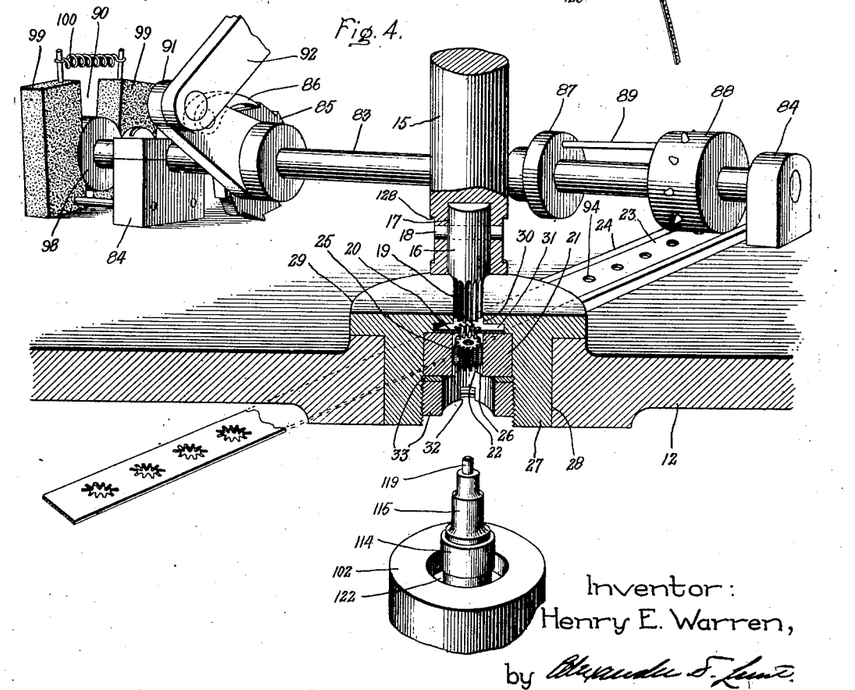

Between the guide bearing opening and the die is a guide tunnel 31 through the die block holder in continuation of the guide way 24, through which tunnel the ribbon 23 passes from said guide way and by which said ribbon is guided over the die as indicated in Fig. 4. In Fig. 2 the ribbon is shown leaving the guide tunnel.

The die block is retained in its holder in an axial open ended recess 32 by threaded locking rings 33, which forces the die block to a seated position in said recess.

When it is desired to change from one type of pinion to another, the punch and die block holder can be quickly changed for a new punch and die block holder, in which last is located a corresponding die for the punch.

Figure 1:
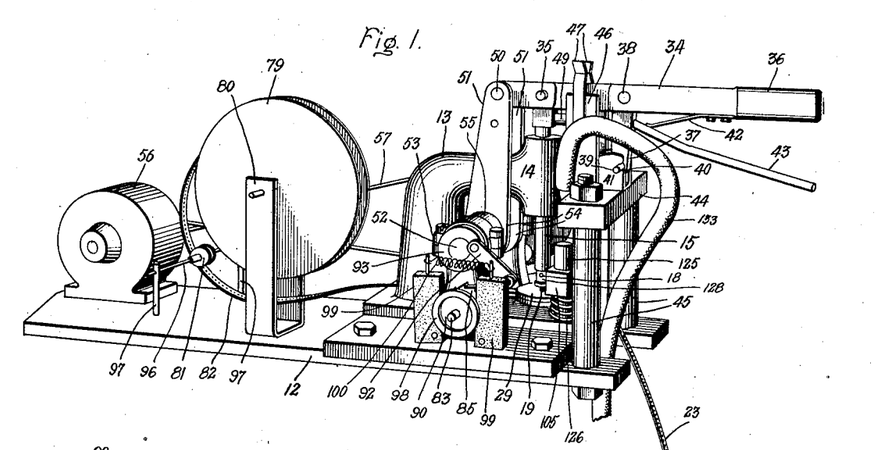
Fig. 1 is a side view in perspective of a pinion-making machine embodying the invention.

The upper end of the punch plunger 15 is pivotally connected with a floating operating lever 34 by a pivot pin 35. The lever extends longitudinally of the machine to a point adjacent the front thereof, where it is provided with a handle 36 by which it may be manually raised or lowered. In Fig. 1 it is shown in its normal lowered or operating position, in which it is retained by a latch 37.

The latch is pivotally connected at the upper end with the lever by a pivot pin 38 and is provided with a latch pin 39 at its lower end, which pin engages notches 40 in a member 41 under the action of a suitable latch spring 42. The spring is secured at one end to the lever adjacent handle 36 and bears against a latch release lever 43 which projects from the latch in a position to be included in the grasp of the handle.

The latch member is mounted on a suitable standard 44 having laterally spaced legs 45 which are secured to the base of the machine. This permits the member to be located adjacent the latch without placing any obstruction between the front of the machine and the punch and die arrangement so that an operator may observe the latter.

The standard 44 also carries two laterally spaced stop fingers 46 having flexible ends 47 which are adapted to hold the operating lever and punch in the raised position shown in Fig. 2 by engaging a roller 48, which is carried on a stud 49 projecting from the upper end of the plunger at a right angle thereto in a frontal direction. The roller passes between the flexible ends of the fingers when the lever is moved into or from the raised position.

Pivotally connected with the rear end of the operating lever by a pivot stud 50 are a pair of spaced parallel arms 51 which form a driving connection between the operating lever and the main drive shaft 52 of the machine. The drive shaft extends laterally of the base below bracket 13 and is journalled adjacent its ends in suitable bearing brackets 53 which are secured to the base. The driving arms 51 lie on opposite sides of the bracket 13 and are formed with lower end bearings 54 encircling a cam or cam section 55 which is provided on the drive shaft integral therewith. The throw of the cam section is such that as the shaft is rotated, arms 51 transmit a reciprocating motion to the rear end of the operating lever of sufficient magnitude to cause the plunger to carry the punch from a retracted operating position shown in Fig. 4 through the ribbon and into the die. For this normal operation, the operating lever pivots on the latch connection.

The drive shaft may be connected with any suitable source of power, such as a small electric motor 56. In the present example the motor is mounted on the machine base, and is connected with the shaft by a suitable belt 57 and pulley 58, the latter being secured to the shaft end. A small hand wheel 59 for manually adjusting the machine in the setting up operation is also secured to the shaft adjacent the driving pulley. The drive shaft rotates in a clockwise direction as viewed from the right-hand side. This is indicated by an arrow on pulley 58 in Fig. 3.

In connection with the driving pulley 58, a brake mechanism for positively stopping the machine in a definite position is provided, wherein the perforated ribbon is centered in the die, for reasons which will hereinafter appear. The pulley carries a projecting pin 61 which is stopped by a spring buffer 61ª introduced into its path by a solenoid magnet 62. A magnet is mounted on a frame 62ª carried by the base 12 and is provided with a sliding core piece 63 with which the buffer is pivotally connected, as indicated at 63ª.

The core piece is moved into and held in a forward position wherein the buffer is in engagement with the stop pin as shown, by a spring 64 which is compressed between a part of the frame and a collar 64ª carried by the core piece. The buffer is connected with a retractile spring 65 by a link 65ª. The spring is in turn connected with a fixed member such as the frame and resiliently holds the buffer when the latter is met by the moving stop pin, so that the pulley and the connected moving parts of the machine are brought to rest gradually against the increasing retractile force of the spring.

A spring pawl 66 mounted on the base, and a single ratchet tooth 66ª in the pulley rim, serve as a means for retaining the pulley in a definite stopped position. For this purpose the stop pin is so located that it meets the buffer as the ribbon is centered in the die by the punch, and the ratchet and pawl are so located that they engage just as the force of the rotating parts is absorbed by the buffer spring. The ratchet then prevents the pulley 58 from rotating backwards under the action of the extended buffer spring and at the same time serves to hold the machine in the definite stopped position wherein the ribbon is properly centered in the die for a subsequent operation, hereinafter described.

When the machine is in operation, the buffer is held out of the path of the stop pin by the solenoid magnet which is then energized, and holds the core piece in a retracted position against the biasing action of spring 65. The stop means provided and shown herein represents any suitable electromagnetic brake means which serves to instantly and positively stop the machine in a definite position when the electromagnet is deenergized. In the present example, the stop means provides for stopping the machine when the punch has passed through the ribbon and the die and has carried the punched lamination onto the stack in the holder below the die as is indicated more particularly in Fig. 3, wherein the cam section of the shaft is shown in a position corresponding to the fully depressed or lowered position of the punch. The ribbon is thus fully centered with respect to the die.

A timing pinion 67 mounted on shaft 52 is arranged to mesh with and drive a timing gear train 68 connected with a cylindrical notched cam 69, and together with said gear train and cam, serves as a means for opening the contacts 70, 71 of a switch 72 which controls the driving motor 56 and electromagnetic brake means. The cam is provided with one or more notches 73 into which the lower hooked end 74 of a switch lever 75 moves under the action of a spring 76 to open the contacts 70, 71. The switch is thus self-opening, and is held closed by the cam surface indicated at 77. In the present example, contact 70 is flexible and is carried by the pivoted switch lever, and contact 71 is adjustable with respect thereto, being in the form of a thumbscrew, the adjustment of which is such that the contacts are firmly closed when the lower end of the switch lever is in contact with the cam surface 77 and instantly opened when said end drops into one of the notches 73 as the cam rotates.

The timing gear train is interchangeable to permit the main drive shaft to rotate a certain predetermined number of revolutions before the switch opens, as will be described hereinafter in connection with the operation of the machine. The switch is reclosed by a suitable operating rod 78 which extends from the switch lever to the front of the machine. The timing means and brake represent any suitable means for setting the machine for automatic stopping when a sufficient number of laminations have been punched to form a pinion of the desired width or thickness.

Referring now to Figs. 1, 2 and 4, the means for automatically feeding the ribbon 23 through the machine in synchronism with the punching operation will be described. The ribbon is carried on a suitable reel 79 which is mounted in the rear of the punch. In the present example, it is mounted on a standard 80 secured to the base.

The ribbon is fed from the spool downwardly around an idler or guide roller 81 placed slightly in the rear of and below the reel so that it is flexed as indicated at 82 and is moved forward between the punch and die in successive equal steps by a positive indexing mechanism driven by the main shaft 52.

The indexing mechanism comprises a ribbon feed shaft 83 which is mounted axially parallel with the main shaft of the machine in suitable spaced bearings 84 secured to the base, a ribbon feed ratchet wheel 85 secured to the shaft, a ratchet pawl 86 by which the ratchet wheel is driven, a fixed collar 87 and loose pin tooth wheel 88 on the shaft connected by a spring rod 89, and a brake means 90 for frictionally loading the shaft.

The pawl 86 is carried by a loose arm 91 on shaft 83, which arm is pivotally connected with one end of a link 92, the opposite end of which is pivotally connected with the end face of a collar 93 secured to the main shaft. This represents any suitable arrangement for rotating the ribbon feed shaft in steps in synchronism with the main shaft and punch. In the present example, the arrangement is such that the pin tooth wheel is rotated or advanced one tooth for each revolution of the main shaft and is so rotated or advanced each time the punch is raised. The proper relation between the punch and the ratchet is established by adjusting the angular relation between the cam section 55 of the main shaft and the driving collar 93 for the ratchet pawl before securing said collar to the ribbon feed shaft. The punch and ribbon feeding or indexing mechanism are thus connected together for synchronous operation.

The pin tooth wheel engages a series of pre-punched equally spaced pivot center holes 94 in the ribbon and successively moves each of said holes into a centered position under the descending punch. The holes form the bore of the stacked laminations for receiving the pivot axis of the finished pinion and each hole is centered before the blank is stamped from the ribbon by a pilot 95, Fig. 5, which extends axially from the end of the punch and is adapted to enter the center holes in the ribbon. The spring rod 89 permits the pin tooth wheel to rotate slightly in either direction with respect to the ribbon feed shaft as the pilot enters the hole in the ribbon, thus providing for accurate alignment between the punch and the center hole. The yieldably driven pin tooth wheel and ratchet provide a simple drive for the ribbon which operates to locate the center holes precisely under the punch while permitting slight movement of the ribbon to conform exactly to the centering action of the pilot 95.

The angular relation between the ratchet wheel 85 and the pin tooth wheel 88 is initially adjusted so that the full throw of the ratchet pawl and corresponding rotation of the pin tooth wheel moves the ribbon to accurately locate the successive center holes under the punch as above mentioned. This is done by rotating the ribbon feed shaft 83 by a full forward throw of the ratchet 86 and then with said shaft held by the brake means 90 and with collar 87 loose on the shaft the collar and pin tooth wheel are rotated by hand to align a hole in the ribbon with the punch. Collar 87 is then secured to the shaft. The friction brake means 90 gives a constant, uniform friction load on shaft 83, and insures a definite, intermittent movement of the ribbon.

The intermittent movement of the ribbon is not transmitted to the ribbon feed reel 79, so that the inertia of the latter does not put stresses on the ribbon, for the reason that the flexed portion 82 of the ribbon which passes over the yieldable guide roller 81 yields easily without being pulled directly from the reel as the ribbon is advanced step by step. The guide roller 81 is carried on a flexible shaft 96 mounted in standards 97 secured to the base. Together with the flexed portion of the ribbon which it holds, it forms a yieldable means between the indexing mechanism and the ribbon reel for absorbing intermittent movement of the ribbon and providing a substantially steady indirect pull on the reel.

The brake means in the present example for frictionally loading the ribbon feed shaft 83 is provided by a drum 98, Figs. 1 and 4, on the shaft, and a pair of pivoted brake shoes 99 which grip the drum under the action of a common retractile spring 100. This represents any suitable arrangement for preventing the shaft from rotating except when and as moved by the ratchet and pawl means.

Referring now to Figs. 2 and 5, attention is directed to the means provided for removing from the holder in the die block the stack of stamped pinion laminations as a mounted finished pinion. This comprises a lower plunger 101 which is maintained in accurate axial alignment with the die and punch in an elongated bearing 102 rigidly secured to the base by a depending bracket 103, and a follower or knockout 104 mounted on a movable swinging arm 105 above the base and which is adapted to carry the follower under and into connection with the punch when the latter is raised and to there maintain the follower in axial alignment with the die.

The lower plunger is maintained in a retracted position below and adjacent the lower opening in the die block and die block holder, as shown in the drawing, except when used to insert a pivot in the pinion. A lever 106 pivoted on the lower end of the bearing 102 serves to move the plunger upwardly in the direction of the die, or to withdraw the plunger to the position shown. The connection between the plunger and the lever is provided by a pair of connecting links 107 which are pivotally connected as indicated at 108 with the lever, and a block 109 slidably mounted on the lower end of the plunger. The block is held between a nut 110 on the end of the plunger and a compressed helical spring 111. The spring surrounds the plunger and seats at its upper end against an adjusting nut 112. This arrangement provides a resilient connection between the lever and the plunger, that is, the upward movement of the plunger is transmitted from the lever to the plunger through the block and spring, whereby the plunger is permitted by the spring to yield slightly if an obstruction is met. In the withdrawal, the block bears against nut 110 and transmits the withdrawing force from the lever directly to the plunger.

The upper end of the lower plunger is provided with an axially extending socket 113, in which is slidably mounted a tubular pivot or spindle carrier 114 having a removable, shouldered head 115. Within the pivot carrier is located a central pin 116 which is secured at its lower end in the bottom of the socket 113 and which, at its upper end, is provided with an axial extension or pivot propeller rod 117 of reduced cross-section. The latter extends into a central pivot socket 118 in the head and forms a seat therein for a pinion pivot shaft or spindle 119.

The slidable pivot carrier 114 is provided with a stop ring 120 which lies in a counterbore 121 in the socket 113 and seats against a stop screw 122 which closes the open end of the counterbore and forms a guide bearing for the pivot carrier. The pivot carrier is biased to move in a forward or upward direction to carry the stop ring into engagement with the stop screw by a helical spring 123 which surrounds the central shaft and is compressed between the bottom of the socket and the lower end of the pivot carrier.

With this arrangement downward pressure on the upper end of the pivot carrier head 115 causes the pinion pivot held in the head to be exposed as the pivot carrier and head move to compress spring 123, or, viewed in another way, stopping the upward movement of the head when carried upwardly by the lower plunger causes the pinion pivot to be pushed outwardly by the propeller rod 117. A rear or lower stop is provided for the pivot carrier between the upper end of the fixed central pin 116 and the lower end of head 115.

The socket 118 in head 115 is adapted to hold a pinion pivot of a certain diameter. The head is removable so that a similar head may be substituted to provide any desired socket size to adapt the machine for making pinions with various pivot sizes. The upper end of the head is adapted to enter the die block and meet the bottom of the stack of pinion laminations when carried upwardly by the lower plunger.

Considering, now, the follower or knockout 104 above the stack of laminations; with the punch raised by releasing latch 37 and raising the operating lever 34 into the position shown in Fig. 2, the knockout is adapted to swing with the arm, under the punch and over the die as shown in Fig. 5. The arm swings on a heavy pivot stud 124 which is secured to the base in axially parallel relation to the punch plunger. The stud is provided with a head 125 which forms an upper stop for the arm. The latter is biased upwardly against the stop by a helical spring 126 which surrounds the stud between the arm and the base.

The arm is provided on its upper side with a pair of fingers 127 which are arranged to engage with a wide shallow groove 128 in the end of the punch plunger. The arm is also provided with a socket 129 between the fingers for receiving the punch. In the present example the socket is provided in the upper end of the knockout 104, which in turn is held in a flanged tubular member 129$^a$ seated in a bore in the arm 105. Fingers 127 are mounted on the upper ends of posts 127$^a$ which are secured at their lower ends in the flange of tubular member 129$^a$. This arrangement permits the punch and knockout to be releasably connected together whereby the knockout may be moved downwardly into the die against the stack of pinion laminations by pulling downwardly on the operating lever.

The knockout or follower is provided with an axial air passage 130 through which an air blast is delivered as it descends into the die. The air passage extends through the arm, as indicated at 131, to a tubular hose inlet connection 132 to which a flexible hose 133 is connected for supplying air under pressure thereto.

The knockout or follower is provided with pinion teeth (not shown) like those on the punch so that it may pass easily through the die, although for larger pinions it would not necessarily be provided with teeth. It will be seen that the knockout moves on and is guided by the stud 124 and is returned by the spring 126. If the latter fails to act, the knockout is withdrawn by the fingers 127 engaging the lower edge of groove 128 as the punch plunger is raised. The use of the knockout and lower plunger will more fully appear under the description of the operation of the machine hereinafter given.

Referring now to the wiring diagram, Fig. 6, it will be seen that the driving motor is provided with a series field 134 and is arranged for series operation from a pair of D. C. supply mains 135, one side of the armature being connected directly with one of the mains by circuit wire 136 and the other side being connected through field 134 and switch contacts 70 and 71 with the other main by a circuit wire 137.

The brake magnet 62 is also connected with the supply mains on the motor side of the switch so that it is energized in parallel with the motor by the closing of contacts 70—71. The brake is thus released when the switch contacts are closed and the brake is instantly set when the switch contacts open to stop the motor by introducing the buffer 61ª into the path of the stop pin 61.

A series D. C. motor is shown only by way of example, as a suitable type. The speed of the motor may be controlled by any suitable means, depending upon the type of motor used. In the present example, it is controlled by a resistance placed across the armature or brushes. This resistance is for convenience a standard incandescent lamp 138 such as is ordinarily used for house lighting. The lamp is connected with the armature by a regular socket connection 139, Fig. 2, and leads 140, Fig. 6. To change the speed of the motor, a lamp of the proper size, that is, resistance, is inserted in the socket to change the current flowing through the field. Various speeds can thus be obtained by using different lamp capacities or resistances of different values.

The operation is as follows: The proper punch and die are inserted in the machine for punching the desired pinion size and shape, and a reel of perforated ribbon of the material from which the pinion is to be formed is placed in the reel standard 80. The leading end of the ribbon is passed under the guide roller 81 and under the pin tooth wheel 88. The first hole in the ribbon is engaged with a tooth on the wheel and the lower plunger 101 and knockout or follower 104 are withdrawn to normal inoperative positions, indicated in Figs. 1 and 2.

Care is taken to see that the operating lever is latched in its lower or operating position. The machine is then started either slowly by manually rotating the handwheel 59 or by momentarily closing the contacts of switch 72 by pulling on the switch rod 78. When first starting the machine, a few turns of the handwheel 59 is desirable to observe that all parts of the machine are functioning properly and to bring the ribbon up to the punch through the guide way 24 and guide tunnel 31 in the die block holder with a center hole aligned with the punch and die.

If the machine is functioning properly after the trial, the timing means is set on zero by rotating the handwheel or by operating the driving motor with the operating lever released and the ratchet pawl 86 raised so that the ribbon is not moved or punched. In the present example, with the timing means shown, the initial position or zero is that in which the lower end of the switch lever is seated in a notch 73 in the cam 69 with the switch contacts open. In any manual operation of the machine, the electromagnetic brake is released by temporarily removing the stop pin 61.

With the operating lever again latched in its operating position, the switch rod is pulled and held for a moment. This starts the motor and releases the brake by energizing magnet 62. After a few revolutions, the switch is held closed by the cam 69.

The punch operates synchronously with the ribbon feeding or indexing mechanism and passes successively through the ribbon and die as the successive perforations in the ribbon are moved up to it by the indexing mechanism. For the punching operation, the latch forms a flexible pivot connection for the operating lever and, together with the driving connection provided by arms 51, permits the operating lever to follow the straight line motion of the punch plunger as it moves in bearing 14.

The punch presses each punched lamination down into the holder in the die block where it forms the top lamination of the stack which is held by friction in the shallow grooves, as hereinbefore described. When the stack is of the proper height to form a pinion of the desired width, the machine is automatically stopped by the timing means. In the present example, the machine is stopped and the brake is locked to instantly stop the main shaft when the cam moves to present a notch to the lower end of the switch lever. This end of the lever drops into the notch under the action of spring 76 and the contacts 70—71 are thereby opened. The present stop arrangement provides for stopping the machine after a certain number of laminations are punched, such for example, as 15 for one type of pinion and 30 for another type. For this purpose, cam 69 is provided with two notches for producing 15 laminations per pinion while a single notch would be used for producing 30 laminations per pinion.

Since the width of the pinion face is not only determined by the number of laminations, but by the thickness of each lamination, the necessary number of laminations for certain pinions will vary with the material used. Hence, any suitable timing or stop mechanism may be provided to stop the machine when the desired pinion thickness is obtained, that shown in the present example providing a definite number of laminations which will provide pinions of uniform width or thickness if the average thickness of the laminations is substantially uniform.

When the machine has automatically stopped after punching the required number of laminations to provide the desired pinion width or thickness, the operating lever latch is released and the lever is raised on pivot pin 50 as the fulcrum, thus raising the punch and punch plunger. The knockout or follower 104 is moved with arm 105 into position under the punch, as shown in Fig. 5. The knockout is thus connected with the punch, and by depressing the operating lever, is moved downwardly through the die to engage the stack of laminations and move the same fully out of the die and down into the lower end of the holder. The lower plunger with the pivot carrier loaded with a pivot or spindle 119 of the proper length and size is then moved upwardly into the die block and holder.

The upper end of the pivot carrier head 115 is stopped in its upward travel by the stack of laminations which is being held against axial movement by the knockout, which, in turn, is held rigidly by means of the operator's grasp on the operating lever, and the pivot is driven upwardly through the stack of laminations by the propeller rod 117 which moves the pivot with the full force of the upward movement imparted to the lower plunger by the operator through lower lever 106. The lower plunger and lever, together with the associated parts, are made relatively heavy, as indicated in the drawing, so that a heavy seating force may be applied to the pivot whereby the stack of laminations, or the pinion, may be given a heavy press fit upon it. This force is prevented from being destructive if the parts do not properly align by the cushioning spring 111.

For the very small clock pinions, for the production of which the method and means of the present invention is particularly adapted, the tightness of the press fit is depended upon to hold the pinion on the shaft and the laminations in alignment. In such pinions, also, the shaft or pivot is made relatively large in diameter in proportion to the size of the pinions.

A blast of air is maintained through the knockout as it descends upon the stack of laminations to blow out small metal or other shavings and chips which are sometimes loosened when the pivot is pressed into the laminations and when the knockout passes through the last stamped hole in the ribbon.

The air blast also assists in freeing the pinion from the knockout when there is a tendency for it to stick thereto as the pinion is forced out of the die block by the knockout, and, mounted on the shaft, descends with the pivot holder or carrier when that is lowered. The knockout thus serves as an abutment when the pivot shaft is inserted, and as a means for forcing the mounted pinion from the holder.

The finished pinion is removed from the carrier and a new pivot is inserted in readiness for the next pinion. The knockout is disconnected from the punch and moved into its inoperative position shown in Fig. 2. The punch is lowered and the operating lever latched in its operating position. The machine is again started by momentarily holding closed the contacts of the controlling switch which simultaneously unlocks the driving shaft and continues in operation until stopped by the timing or automatic stop means when the same operations are performed as before in mounting and removing the pinion from the machine.

From the foregoing description it will be seen that, in accordance with the present invention, pinions and the like are made by pressing a stack of laminations onto a pivot or holder shaft after each lamination has been stamped from a ribbon, and held in stacked alignment with others to form the desired pinion thickness. By this method the pinions are made from laminations which are cut before being assembled, each lamination being in itself a perfectly formed thin pinion or body when placed upon the stack and the laminations are stacked in proper angular alignment and mounted without handling. This arrangement makes it practicable to provide small pinions from finished laminations, as the laminations are of such small size that they cannot be picked up with the fingers or readily handled.

Several additional advantages which accrue from the use of a machine embodying the invention may be mentioned briefly in connection with the manufacture of pinion gears. Such advantages are, however, not limited to the manufacture of pinions alone. Laminated pinions can be made and mounted on shafts by the machine of the present invention at a cost considerably less than for solid pinions made by ordinary means. By way of example, and not in any way as a limitation, it may be said that the machine herein described and illustrated can turn out between 1500 and 2000 small mounted clock pinions per day.

It will also be seen that the pinion and shaft may be of different materials, each best suited to the operating stresses and wear it is to meet. For example, for small clock motors, the pinion pivots or shafts may be made of stainless iron, which contains considerable chromium and is, therefore, very difficult to machine, but is desirable on account of its wearing qualities and resistance to corrosion. The pinion body may be made out of ordinary steel and give satisfactiry service. Furthermore, where noise is an important factor to be considered, these laminated pinions can be made from paper, or other soft material, and still be mounted on steel or stainless iron pivots or shafts.

By the use of the machine of the present invention, it will further be seen that uniformity of the product is obtained to a greater extent than heretofore. Gear cutters, used to cut solid pinions, wear and change the shape of the pinion teeth, which they produce, faster than dies. Furthermore, it is not as easy to maintain the same precision with regard to centering, and all other dimensions, where pinions are first turned on the shafts and afterwards cut, as it is by the method and means of the present invention.

From the foregoing, it will be seen that the machine of the present invention provides for the more economical manufacture of small pinion gears and the like than has heretofore been possible, and, while the invention has been described and illustrated in what is at present considered to be its best embodiment and as applied more particularly to the manufacture of very small pinion gears, it should be understood that it is not limited thereto and may be carried out by other means and applied to the production of similar articles of manufacture.

What I claim as new and desire to secure by Letters Patent of the United States is:

1. In a machine, the combination of a punch and die adapted to punch definitely shaped bodies from thin sheet material, each of said bodies having an opening, a holder in which the bodies are directly received and held in stacked formation one above the other as they are discharged from the die, and means for forcing a spindle through the openings in the bodies while they are retained in stacked assembled relation to each other in the holder to simultaneously unite them.

2. In a machine, the combination of a punch and die adapted to punch definitely shaped bodies from a perforated ribbon of wafer-like thinness, the perforations in which ribbon provide openings in said bodies, a holder in which the bodies are directly received and held in stacked formation as they are discharged from the die, and means for forcing a spindle through the openings in the bodies while they are retained in stacked, assembled relation to each other in the holder to simultaneously unite them.

3. In a machine, the combination of a punch and die adapted to punch definitely shaped bodies from a perforated ribbon of wafer-like thinness, the perforations in which ribbon provide openings in said bodies, a holder in which the bodies are directly received and stacked as they are discharged from the die, said holder being adapted to hold the laminations in stacked formations with the openings in alignment with each other, means for forcing a spindle through the aligned openings in the stack of bodies while it is retained in the holder, and means providing an abutment which holds the stack against axial movement when the spindle is being inserted and which is movable to force the stack from the holder.

4. In a machine of the character described, the combination of a punch and die adapted to punch toothed bodies from thin sheet material, each of said bodies having a central opening, a holder having its axis aligned with that of the die and in which the bodies are vertically stacked and held in the same angular position that they occupied in the die, said holder being provided with means for engaging the teeth on said bodies, and means aligned with the die for forcing a spindle through the openings in the bodies to simultaneously unite them while they are retained by the holder in stacked formation.

5. In a machine of the character described, the combination with a removable die and a power driven removable punch cooperating therewith, of means below the die for frictionally holding punchings produced thereby in stacked formation, an indexing mechanism for feeding thin sheet material between the punch and die connected with the punch whereby it is driven synchronously therewith, means for withdrawing the punch to a retracted position, means providing a combined abutment and knockout for punchings which is adapted to engage the punch when retracted, and to move therewith through the die and into the frictional holding means below the latter, and an axially movable pivot carrier mechanism below the die in axial alignment therewith.

6. In a machine, the combination of a punch and die adapted to punch definitely shaped bodies from a perforated ribbon of wafer-like thinness, the perforations in which ribbon provide openings in said bodies, a holder in which the bodies are directly received and held in stacked relation to each other with the openings in alignment as they are discharged from the die, means for automatically stopping the machine when the stack has reached a predetermined height in the holder, means for forcing a spindle through the aligned openings in the stack of bodies while it is retained in the holder, and means providing an abutment which holds the stack against axial movement when the spindle is being inserted and which is movable to force the stack from the holder.

7. In a machine of the character described, the combination of a base, a removable die carried by the base, means providing a holder for a stack of punchings below and in axial continuation of the die, said holder having surfaces which engage the edges of the punchings to hold them in aligned, stacked formation, a punch carried in rigid axial alignment with the die for pressing punchings through the die into said holder, an indexing mechanism for feeding a perforated ribbon of thin material between the punch and the die from which ribbon said punchings are cut with the perforations as centers, said mechanism including a resiliently mounted toothed wheel which engages the perforations in the ribbon and being connected with the punch whereby it is operated synchronously therewith, means in the holder for receiving and holding the punchings in stacked alignment with each other, the perforation forming an axial opening through the stack, means for automatically stopping the machine when the stack in the holder reaches a certain height, and means for pressing a spindle through said opening in the stack to unite the punchings into a laminated body while said punchings are retained in the holder.

8. The method of making definitely shaped bodies which comprises punching definitely shaped laminations therefor from a thin ribbon of material having spaced perforations which form central openings for said laminations and by which perforations the ribbon is indexed to carry said perforations successively into registration with the punching position, causing said laminations to stack successively in registering alignment with each other as discharged from the punching position until a laminated body of a desired thickness is provided, and then while holding the laminations in stacked formation as discharged from the die, simultaneously uniting all of the laminations by frictional engagement with a spindle which is pressed through the central openings therein.

9. In a machine, the combination of a punch and die adapted to punch definitely-shaped bodies from sheet material, each of said bodies having an opening, an elongated holder in which the bodies are received and stacked as they are discharged from the die, means for simultaneously forcing a uniting member through the openings in all of the bodies while they are retained in the holder in stacked formation and means to eject the united assembly from the holder.

10. In a machine of the character described, the combination of a punch and die adapted to punch toothed bodies from sheet material, each of said bodies having an opening, a holder having its axis aligned with that of the die in which the bodies are received from the die, said holder having means for retaining said bodies in stacked relation to each other in the same angular positions which they occupied in the die, means aligned with the die for simultaneously forcing a uniting member through the openings in the bodies while they are retained in such stacked relation and angular positions in the holder, and means to eject the united assembly from the holder.

11. In a machine of the character described, an open die, a holder having open ends with one of which the die communicates, said holder being adapted to receive and hold in stacked relation to each other a plurality of punchings, a punch which is movable to pass through the die to cut punchings from sheet material and into the holder through said open end to place said punchings into contact with each other to form a stack in the holder, a knockout member which is movable into the holder through said open end, and a movable plunger member having a head which is adapted to enter the holder through the opposite open end thereof.

12. The method of making definitely-shaped small bodies which comprises successively cutting a required number of laminations therefor of desired shape and size by punching from a moving perforated ribbon, each lamination including a perforation and being pressed from the ribbon directly into contact with a preceding lamination to form a stack in which the laminations and perforations therein are held in registering alignment with each other, and then simultaneously uniting all of the laminations while holding the same in stacked formation by forcing a uniting member through the aligned perforations to engage each lamination.

13. The method of making definitely-shaped small bodies which comprises successively cutting a required number of laminations therefor of desired shape and size by punching from a moving perforated ribbon of material of wafer-like thinness, each lamination including a perforation and being pressed from the ribbon directly into contact with a preceding lamination to form a stack in which the laminations and perforations therein are held in registering alignment with each other, and then simultaneously uniting all of the laminations while holding the same in stacked formation by pressing a spindle through the aligned perforations to frictionally engage said laminations.

In witness whereof, I have hereunto set my hand this 14th day of December, 1926.

HENRY E. WARREN.